United States Patent
Curti et al.

(10) Patent No.: US 12,249,080 B2
(45) Date of Patent: Mar. 11, 2025

(54) METHOD FOR DETECTING AND TRACKING ORBITING OBJECTS BY ON-BOARD PROCESSING OF IMAGES ACQUIRED BY A SPACE PLATFORM

(71) Applicant: Arca Dynamics Societa' A Responsabilita' Limitata Semplificata, Rome (IT)

(72) Inventors: Fabio Curti, Rome (IT); Daniele Luchena, Rome (IT); Marco Moriani, Rome (IT); Dario Spiller, Rome (IT)

(73) Assignee: Arca Dynamics Societa' A Responsabilita' Limitata Semplificata, Rome (IT)

( * ) Notice: Subject to any disclaimer, the term of this patent is extended or adjusted under 35 U.S.C. 154(b) by 433 days.

(21) Appl. No.: 17/614,825

(22) PCT Filed: May 29, 2020

(86) PCT No.: PCT/IB2020/055127
§ 371 (c)(1),
(2) Date: Nov. 29, 2021

(87) PCT Pub. No.: WO2020/240501
PCT Pub. Date: Dec. 3, 2020

(65) Prior Publication Data
US 2022/0245833 A1 Aug. 4, 2022

(30) Foreign Application Priority Data

May 29, 2019 (IT) .......... 102019000007509

(51) Int. Cl.
*G06T 7/246* (2017.01)
*G06T 7/00* (2017.01)
*B64G 1/36* (2006.01)

(52) U.S. Cl.
CPC .......... *G06T 7/248* (2017.01); *G06T 7/97* (2017.01); *B64G 1/361* (2013.01); *G06T 2207/10016* (2013.01); *G06T 2207/20221* (2013.01)

(58) Field of Classification Search
CPC .......... G06T 7/248; G06T 7/97; G06T 2207/10016; G06T 2207/20221; G06T 7/246; G06T 2207/20081; G06T 2207/20084; B64G 1/361
See application file for complete search history.

(56) References Cited

U.S. PATENT DOCUMENTS

| | | | |
|---|---|---|---|
| 8,805,008 B1* | 8/2014 | Gillis | G06F 18/23 382/103 |
| 2011/0081043 A1* | 4/2011 | Sabol | G06T 7/254 382/103 |

OTHER PUBLICATIONS

Stoveken, et al., Algorithms for the Optical Detection of Space Debris Objects, Proceedings of the Fourth European Conference on Space Debris, 2005.

(Continued)

*Primary Examiner* — Nancy Bitar
*Assistant Examiner* — Dustin Bilodeau
(74) *Attorney, Agent, or Firm* — McCarter & English, LLP

(57) ABSTRACT

The invention concerns a method (1) for detecting and tracking objects orbiting around the earth (for example space debris) by means of on-board processing of images acquired by a space platform (for example a satellite, a space vehicle or a space station) by one or more optical sensors, preferably one or more star trackers.

11 Claims, 2 Drawing Sheets

(56) References Cited

OTHER PUBLICATIONS

Lee, et al., Hardware-in-the-Loop Comparison of Space Object Detection and Tracking Methodologies, AAS/AIAA Spaceflight Mechanics Meeting AAS, 2016.
PCT International Search Report and Written Opinion dated Sep. 9, 2020 for PCT/IB2020/055127.

\* cited by examiner

METHOD FOR DETECTING AND TRACKING ORBITING OBJECTS BY ON-BOARD PROCESSING OF IMAGES ACQUIRED BY A SPACE PLATFORM

CROSS-REFERENCE TO RELATED APPLICATIONS

This patent application is a 35 U.S.C. § 371 National Stage filing of International Application No. PCT/IB2020/055127, filed on May 29, 2020, which application claims priority from Italian patent application no. 102019000007509 filed on May 29, 2019, the entire disclosures of which are incorporated herein by reference.

TECHNICAL FIELD OF THE INVENTION

The present invention relates to a method for detecting and tracking objects orbiting around the earth (for example space debris) by on-board processing of images acquired by a space platform (for example a satellite, a space vehicle or a space station) by means of one or more optical sensors, such as for example one or more star trackers, one or more colour and/or black-and-white cameras or video cameras, one or more infrared sensors, etc.

In this regard, it is important to draw the attention on the fact that the invention will be hereinafter described referring explicitly to the use of one or more star trackers, being understood that such invention can be however implemented using also other types of optical sensors.

STATE OF THE ART

As known, star trackers are optical devices used on board satellites to determine with extreme precision the attitude of satellites in orbit. The attitude information items provided by star trackers are generally used by on-board systems for attitude control, guidance and navigation.

In order to determine the attitude of a satellite, a star tracker installed on board said satellite is typically configured to:
- acquire images of the star field observable by said star tracker at visible and near-infrared wavelengths;
- identify geometrical patterns related to potential stars present in the acquired images;
- compare the identified geometrical patterns with a predefined stored star catalogue, in order to determine the stars actually observed; and
- compute the attitude of the satellite with respect to the stars actually observed.

By contrast, presently the estimate of the angular velocity of satellites is typically based on the use of very precise gyroscopic sensors which, however, have different disadvantages, specifically:
- they are generally affected by a non-constant measurement bias which requires a specific filter;
- they are very expensive (in particular, much more than star trackers);
- they require space for installation and increase the complexity of on-board guidance, navigation, and attitude control systems, since they are very sophisticated and complex devices (as opposed to star trackers) that must be housed inside satellites.

In order to overcome the aforesaid problems related to the use of gyroscopes, the Applicant filed, on Jan. 15, 2019, the Italian patent application No. 102019000000619 concerning an innovative method for estimating both the attitude and the angular velocity of a satellite (or, more in general, of a space platform) only using information items provided by one or more star trackers (or, more in general, by one or more optical sensors).

In particular, the Italian patent application No. 102019000000619 concerns a method for estimating an angular velocity of a space platform equipped with at least an optical sensor, wherein said method comprises:
a) acquiring, by means of an optical sensor, a first image and a second image, wherein the first image is related to a first time instant and the second image is related to a second time instant subsequent to the first time instant;
b) identifying, based on intensities of pixels in the first image acquired, first clusters of pixels related, each, to a respective star;
c) determining, for each first cluster of pixels, a respective first centroid;
d) identifying, based on intensities of pixels in the second image acquired, second clusters of pixels related, each, to a respective star;
e) determining, for each second cluster of pixels, a respective second centroid;
f) detecting pairs of clusters of pixels each comprising a respective first cluster of pixels and a respective second cluster of pixels both related to one and the same star;
g) for each pair of clusters of pixels detected, detecting if said pair of clusters of pixels is of a first predefined type or of a second predefined type;
h) for each pair of clusters of pixels of the first predefined type, computing
   a respective first star versor on the basis of the respective first centroid of the respective first cluster of pixels and
   a respective second star versor on the basis of the respective second centroid of the respective second cluster of pixels;
i) for each pair of clusters of pixels of the second predefined type,
   carrying out a polynomial interpolation of said pair of clusters of pixels thereby obtaining a respective interpolation polynomial which interpolates the respective first cluster of pixels and the respective second cluster of pixels,
   sampling said respective interpolation polynomial in a plurality of sampling points and,
   for each sampling point, computing a respective third star versor;
j) estimating an angular velocity of the space platform based on the computed first, second and third star versors, thereby obtaining an angular velocity estimate related to the first instant of time.

As known, today it is strongly felt the issue of space crowding due to the presence of an increasing number of space satellites and platforms (e.g., the international space station) orbiting around the earth, as well as to the huge amount of space debris. Therefore, nowadays, several infrastructures for space monitoring exist or are being developed/enhanced, such as for example the US Space Surveillance Network (US-SSN) and the Space Surveillance & Tracking (SST) European programme.

Generally, such infrastructures for space surveillance have the object of:
allowing to assess and reduce collision risks between orbiting objects (for example, between a space satellite and a debris) and acting, as necessary, with preventive measures for mitigating said risks (for example, making a satellite perform proper anti-collision manoeuvres);

allowing to reduce the risks related to the launch of new satellites or, more generally, of new space platforms; and monitoring non-controlled returns of objects (for example space debris) from the space into the earth atmosphere and possibly spreading out prompt warnings in order to reduce risks for people's safety and to try avoiding damages to ground infrastructures.

Typically, the current infrastructures for space surveillance use observation systems arranged on the earth surface, such as for example telescopes, and radar and/or optical sensors.

Unfortunately, however, the actual capacities of detecting and tracking space objects of the current infrastructures used for space surveillance are still rather limited.

Therefore, it is presently highly felt the need for systems/technologies which enable to increase coverage and reliability of the space surveillance.

OBJECT AND SUMMARY OF THE INVENTION

Object of the present invention is to provide a method for detecting and tracking objects orbiting around the earth (for example space debris) based on information items provided only by one or more optical sensors (preferably one or more star trackers, but also one or more colour and/or black-and-white cameras or video cameras, one or more infrared sensors, etc.) mounted on board a space platform (for example, a satellite, a space vehicle, a space station, etc.), which method allows to provide useful information items for space surveillance, for example for SST-type applications.

This and other objects are achieved by the present invention as it relates to a method for detecting and tracking space objects, according to what defined in the enclosed claims.

BRIEF DESCRIPTION OF THE DRAWINGS

For a better understanding of the present invention, some preferred embodiments, given merely for illustrative and non-limiting purposes, will be now illustrated referring to the enclosed drawings (not on a scale), wherein.

DETAILED DESCRIPTION OF PREFERRED EMBODIMENTS OF THE PRESENT INVENTION

The following description is provided to allow an expert in the field to make and use the invention. Various modifications to the embodiments set forth will be immediately apparent to experts and the general principles herein disclosed may be applied to other embodiments and applications, without, however, departing from the scope of protection of the present invention as defined in the enclosed claims.

As previously explained, the invention will be described hereinafter referring, merely for ease of description, to the use of one or more star trackers, being understood that the teachings of the present invention can be advantageously exploited, mutatis mutandis, even with other types of optical sensors (such as, for example, one or more colour and/or black-and-white cameras or video cameras, one or more infrared sensors, etc.).

Figure 1:
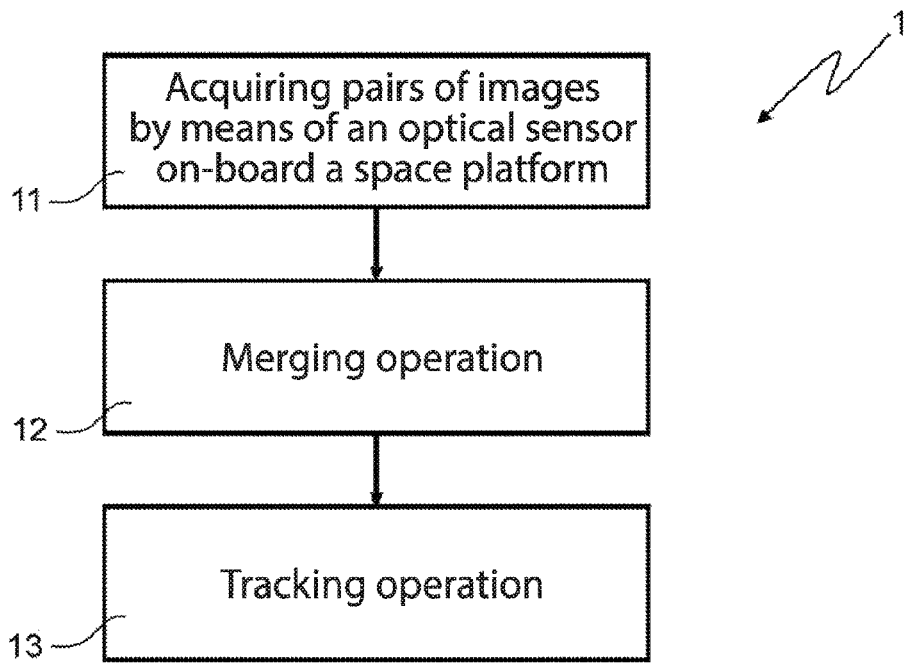
FIG. 1 schematically shows a method for detecting and tracking space objects according to a preferred embodiment of the present invention.

FIG. 1 schematically illustrates a method (indicated as a whole by 1) for detecting and tracking space objects according to a preferred embodiment of the present invention.

In particular, the method 1 comprises:

acquiring, by means of an optical sensor (for example a star tracker) mounted on a space platform orbiting around the earth (for example a satellite, a space vehicle or a space station), pairs of images, wherein each pair of images comprises a respective first image and a respective second image acquired immediately after said respective first image (block 11 in FIG. 1); and, for each new pair of images acquired, carrying out a merging operation (block 12 in FIG. 1) and a tracking operation (block 13 in FIG. 1).

The merging operation (block 11) includes:

identifying, in the first image of the new pair of images, first clusters of pixels related to potential space objects (for example space debris and/or other space platforms) imaged in said first image;

identifying, in the second image of the new pair of images, second clusters of pixels related to potential space objects (for example space debris and/or other space platforms) imaged in said second image; and detecting pairs of clusters of pixels each comprising a respective first cluster of pixels and a respective second cluster of pixels both related to one and a same potential space object imaged in the new pair of images, wherein said respective first cluster of pixels and said respective second clusters of pixels are merged together.

The tracking operation (block 13) includes detecting, from among the pairs of clusters of pixels merged together, pairs of clusters of pixels related to space objects detected in one or more previous pairs of images, on the basis of stored tracking information items indicative of last positions and average velocities of space objects detected in one or more previous pairs of images.

Preferably, the merging operation (block 12) includes also computing:

a respective centroid of each first cluster of pixels and of each second cluster of pixels; and a displacement velocity of the centroids of the pairs of clusters of pixels merged together.

Furthermore, still preferably, the stored tracking information items are indicative of a last centroid position and of an average velocity related to a given space object detected in one or more previous pairs of images.

Finally, always preferably, the tracking operation (block 13) also includes:

estimating a new centroid position for the given space object based on the last centroid position and the average velocity related to said given space object, and a given time interval elapsed between acquisition of the image for which said last centroid position was computed, and acquisition of the first image of the new pair of images;

detecting, from among the pairs of clusters of pixels merged together, a pair of clusters of pixels related to the given space object for which the centroid of the respective first cluster of pixels is within a search area that is centred on the new centroid position estimated and that has predefined dimensions; and updating/integrating the stored tracking information items based on the displacement velocity and the positions of the centroids of the pair of clusters of pixels related to the given space object.

Conveniently, in the tracking operation (block 13), estimating a new centroid position for the given space object includes:

estimating a centroid displacement based on the average velocity related to the given space object and on the given time interval; and estimating the new centroid position based on the last centroid position related to the given space object and on the estimated centroid displacement;

wherein the predefined dimensions of the search area increase as the estimated centroid displacement increases.

More preferably, in the merging operation (block 12), computing the centroid displacement velocity of the pairs of clusters of pixels merged together includes computing magnitude and direction of the displacement velocities of said centroids;

wherein, in the tracking operation (block 13), detecting a pair of clusters of pixels related to the given space object includes:

if different pairs of clusters of pixels merged together have the centroid of the respective first cluster of pixels within the search area, detecting the pair of clusters of pixels related to the given space object based on a comparison between the directions of the displacement velocities of the centroids of said pairs of clusters of pixels and the direction of the average velocity related to the given space object.

Conveniently, the merging operation (block 12) further includes computing a respective density of each pair of clusters of pixels merged together based on a respective overall number of pixels of the two clusters of pixels merged together and on an overall length of said two clusters of pixels merged together;

wherein the stored tracking information items are also indicative of an average density related to the given space object;

wherein, in the tracking operation (block 13), detecting a pair of clusters of pixels related to the given space object further includes:

if several pairs of clusters of pixels are detected based on the comparison between the directions of the displacement velocities of the centroids and of the average velocity, detecting the pair of clusters of pixels related to the given space object based on the average density related to the given space object and on the densities of said pairs of clusters of pixels;

and wherein the stored tracking information items are updated/integrated also based on the density of the pair of clusters of pixels related to the given space object.

More conveniently, if several pairs of clusters of pixels are detected based on the comparison between the directions of the displacement velocities of the centroids and of the average velocity, the pair of clusters of pixels related to the given space object is detected minimising a cost function based on the average density related to the given space object and on the estimated centroid displacement.

Preferably, the merging operation (block 12) includes also discarding some pairs of clusters of pixels merged together according to a predefined selection criterion (for example, for the purpose of discarding the pairs of clusters of pixels related to stars); wherein the tracking operation (block 13) is carried out only for the non-discarded pairs of clusters of pixels merged together.

Conveniently, the merging and tracking operations of the method for detecting and tracking space objects according to the present invention may be carried out by means of one or more electronic processing units (for example of the Field Programmable Gate Array (FPGA) type or Application Specific Integrated Circuit (ASIC) type) which is/are installed on board the space platform and that can be integrated directly into the optical sensor, or connected thereto.

For a better understanding of the present invention, hereinafter a specific preferred embodiment of the invention will be described wherein a star tracker is specifically used.

The preliminary operations carried out by a star tracker as for image processing can be conveniently subdivided into two main groups, namely:

1) a pre-processing wherein pixels with more energy (that is having higher intensities) are detected, which are therefore more likely to be related to stars or orbiting objects (for example space debris); and 2) a grouping (or "clustering") operation wherein pixels detected in the pre-processing step are grouped in "clusters" (or groups) representing possible stars/orbiting objects.

Typically, in the clustering operation, only pixels that are adjacent at least at a vertex are grouped together. For each cluster (or group) of pixels a centroid is determined based on a weighted average, based on the energy (namely the intensity), of the pixels of the cluster.

A moving object can sometimes leave a long and non-compact strip, namely with gaps along the detected track. In such a case, as taught in the Italian patent application No. 102019000000619, joining pixels is generalized such as to join pixels falling into a predefined neighbourhood. The joining confirmation is carried out by polynomial interpolation (which can, for example, be considered as satisfactory when the standard deviation of the pixels from the polynomial is below a predefined threshold).

The method according to the present invention conveniently comprises two main operations:

a merging operation, applied to each pair of consecutive images; and a tracking operation, applied to subsequent pairs of images for which the merging operation was already carried out.

Figure 2:
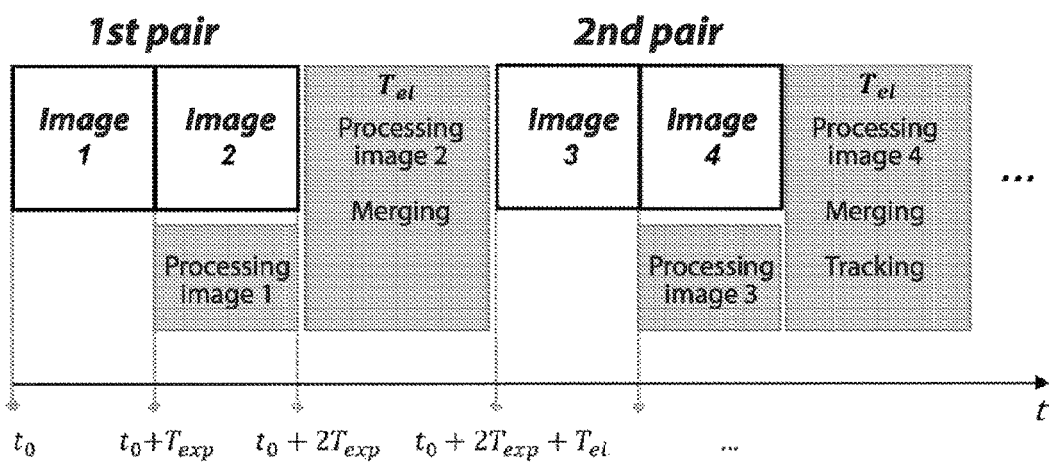
FIG. 2 schematically illustrates an example of a sequence of operations carried out implementing the method of FIG. 1.

In FIG. 2 an example of operation sequence is schematically illustrated, wherein:

a first image is acquired, namely captured, in a time interval $T_{exp}$ (in particular, between $t_0$ and $t_0+T_{exp}$);

a second image is acquired, namely captured, immediately after the first image (in particular, between $t_0+T_{exp}$ and $t_0+2T_{exp}$), and in this time period the pre-processing and the clustering operation are applied to the first image;

immediately after finishing acquiring the second image, the pre-processing and the clustering operation are also applied to said second image, after which the merging operation related to the first and second images is carried out, the whole within a time interval $T_{el}$ (in particular, between $t_0+2T_{exp}$ and $t_0+2T_{exp}+T_{el}$);

subsequently the previous operations are carried out again related to a third image and a fourth image;

finally, after applying pre-processing and clustering also to the fourth image and performing the merging operation also for the third and fourth images, the tracking operation is carried out based on the first pair of images formed by the first image and the second image for which merging was already carried out and the second pair of images formed by the third image and the fourth image for which merging was already carried out.

1. Merging

In the merging operation, the track of an object (for example a star or an orbiting body, such as a space debris or another space platform) is conveniently recognized as a strip according to the displacement of centroids in the consecutive images subject to merging. In particular, given two centroids of a same object in two consecutive images, the distance between such centroids is conveniently assessed. If the distance exceeds a predefined threshold value (for example set by a user), then the trace of the object is recognized as a strip and treated as such.

Strips belonging to the same object (e.g. a star or an orbiting object, such as a space debris or another space platform) and detected in two consecutive images are joined taking advantage of the polynomial interpolation technique, thus performing a merging operation of the strips. Conveniently, said strip merging operation includes:

supposing that the strips belong to the same object as they are very close (for example, strips touch between each other or are distant less than a pixel threshold value—e.g. referred to as a predefined number of pixels); and confirming the merging by a polynomial interpolation, for example with a second-degree polynomial.

As explained above, if the centroids of two clusters of pixels related to a same object in two consecutive images are closer than a predefined threshold, then the polynomial interpolation is not carried out as the two clusters of pixels are considered as two traditional circular spots which can be conveniently joined on a purely geometrical basis. If, by contrast, interpolation is successfully carried out, a polynomial is then obtained which generalizes the "centroid" idea of the stationary case. In fact, in this latter case the interpolation polynomial can be identified as the area covered by the object during the acquisition/capture time (or similarly, of exposure) of the two images (i.e., $2T_{exp}$).

Figure 3:
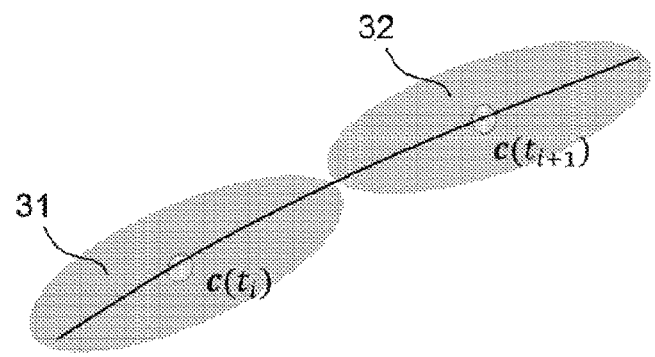
FIG. 3 schematically illustrates an example of a space object represented by two "strips" in two time-consecutive images acquired by a star tracker.

In this regard, FIG. 3 schematically illustrates an example wherein a same object (e.g., a star or an orbiting object) appears, in two images acquired by a star tracker and related to two subsequent time instants $t_i$ and $t_{i+1}$, as two strips that are later merged by means of polynomial interpolation, wherein:

31 denotes a first strip that is representative of the object at a first time instant $t_i$ (i.e. in the first image of the pair of images subject to merging), whose centroid is indicated as $c(t_i)$; and 32 denotes a second strip that is representative of the object at a second time instant $t_{i+1}$ (i.e. in the second image of the pair of images), whose centroid is indicated as $c(t_{i+1})$.

Conveniently, in the merging operation the displacement velocity of the centroid is also computed as:

$$v = \frac{\Delta c}{\Delta t} = \frac{c(t_{i+1}) - c(t_i)}{t_{i+1} - t_i},$$

as well as the density of the merged object $\rho$ as a ratio between:

the overall number of pixels of the two merged strips 31 and 32 and the overall length (in terms of number of pixels) of the two merged strips 31 and 32.

Conveniently, the clusters of merged pixels characterized by a low displacement velocity value of the centroid (for example, lower than a pre-set threshold set by a user) are removed. In fact, in case of inertial pointing, such clusters of pixels are associated to stars and therefore they are not useful for the purpose of the following processing aimed at detecting and tracking orbiting objects (for example, space debris). In case of non-inertial pointing, i.e. with non-negligible angular velocities, stars can be conveniently removed using the attitude quaternion provided by the star tracker and comparing the pixel clusters in the image with the stars in the on-board catalogue.

2. Tracking

In the tracking operation subsequent pairs of images containing centroids previously thought to belong to a same object are processed, with measurement gaps between pairs. The measurement gap between pairs is considered, for merely exemplary purposes, to take account of the time necessary for the on-board processing unit to process acquired images, in particular to perform merging and tracking operations.

Conveniently, the results of the tracking operation are stored in a specific on-board database, in particular the positions of each single centroid of an object, from when it enters the field of view of the star tracker until it exits therefrom.

Preferably, the tracking operation comprises carrying out:

a) a position-based search—given a new pair of consecutive images over time, the position of the centroid of a tracked object in the new images is estimated and centroids potentially related to the tracked object are searched in a search area which is centered on said estimated position of the centroid and has a given extension (in terms of pixels) around said estimated position; furthermore, given a centroid in a given pair of images, if no centroid in the following pair of images is detected, then the search area is widened so as to consider the propagation of estimate errors for the next position of the centroid in the still subsequent pair of images (as it will be described more in detail hereinafter);

b) a filtering of the potential centroids identified in the step a) based on the velocity—in this step, the directions of the instantaneous velocities of the potential centroids detected inside the search area are computed which are then compared with the average velocity of the searched object or, more generally, with the average velocities of all the tracked objects (as will be described more in detail hereinafter); when the position-based search leads to the identification of more than one centroid for a same tracked object, velocity-based filtering allows to recognize the case of two different objects intersecting;

c) if necessary, even a density-based filtering—in this step, the densities of two close clusters of pixels (e.g., they touch or are distant less than a threshold value expressed in terms of a predefined number of pixels) are compared and the two clusters are combined only in case their densities are consistent between each other (as will be described more in detail hereinafter).

2.1 Position-Based Search

The search is based on the estimate of the positions of centroids in each new pair of images for each tracked object.

Let us suppose that the last pair of images and a new pair are separated by a time interval $T_{el}$ required for processing the last pair of images. The criterion used for the merging operation based on the distance of the pixel clusters can be conveniently exploited to associate also the merged clusters of two subsequent pairs of images. In this case, however, the merged cluster in the new pair of images cannot be as close as in the merging event (which, as previously explained, is applied to two immediately consecutive images over time), therefore an estimate of the cluster position, i.e. of the relative centroid, in the new pair of images is necessary.

Figure 4:
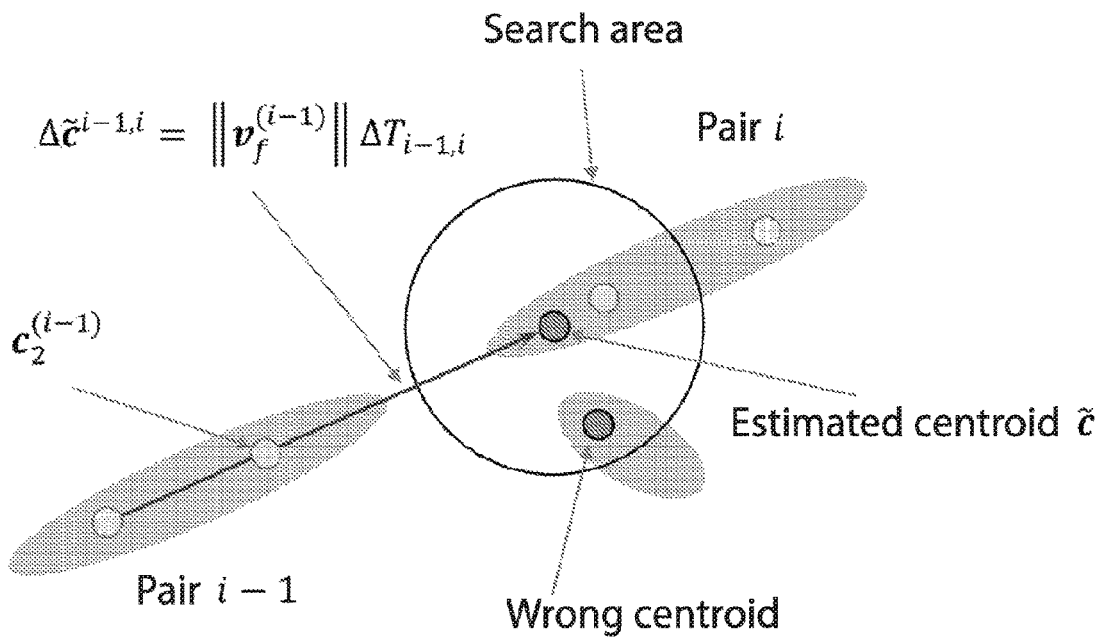
FIG. 4 schematically illustrates an example of search in a new pair of images for a centroid of a cluster of pixels related to an object detected and tracked in previous pairs of images, according to a preferred embodiment of the present invention.

In this regard reference can be made to FIG. 4 that schematically illustrates an example of search, in a new pair of images, for a centroid of a cluster of pixels related to an object detected and tracked in previous pairs of images.

Conveniently, the information items on velocity used for the search are assessed with a moving average serving as a digital low-pass filter and reduces the risk of propagation errors. In fact, using the velocity estimates until the pair of images (i−1), the average velocity $\bar{v}_f^{(i-1)}$ can be computed as:

$$\bar{v}_f^{(i-1)} = \frac{1}{N_a} \sum_{j=i-N_a}^{i} \bar{v}^{(j-1)}, \quad (1)$$

supposing that pairs of images are available $N_a$.

As illustrated in FIG. 4, given the information items on velocity and the last position stored of the centroid, the estimate of the centroid position $\tilde{c}_1^i$ in the first image of the pair i is assessed as:

$$\tilde{c}_1^i = \Delta \tilde{c}^{i-1,i} + c_2^{i-1} = v_f^{(i-1)} \Delta T_{i-1,i} + c_2^{i-1},$$

where $c_2^{i-1}$ indicates the centroid position in the second image of the pair of images (i−1) and $\Delta \tilde{c}^{i-1,i}$ indicates the estimate of the centroid displacement.

The time interval $\Delta T_{i-1,i}$ is equal to:

$$\Delta T_{i-1,i} = T_{exp} + T_{el}.$$

The search for potential centroids is conveniently carried out only if the estimated position of the centroid falls within the detector area of the star tracker.

As illustrated in FIG. 4, in order to offset the estimate errors, in the search a circle centered on the estimated centroid is conveniently used and the search for potential centroids is carried out within this circle having a predefined radius.

Figure 5:
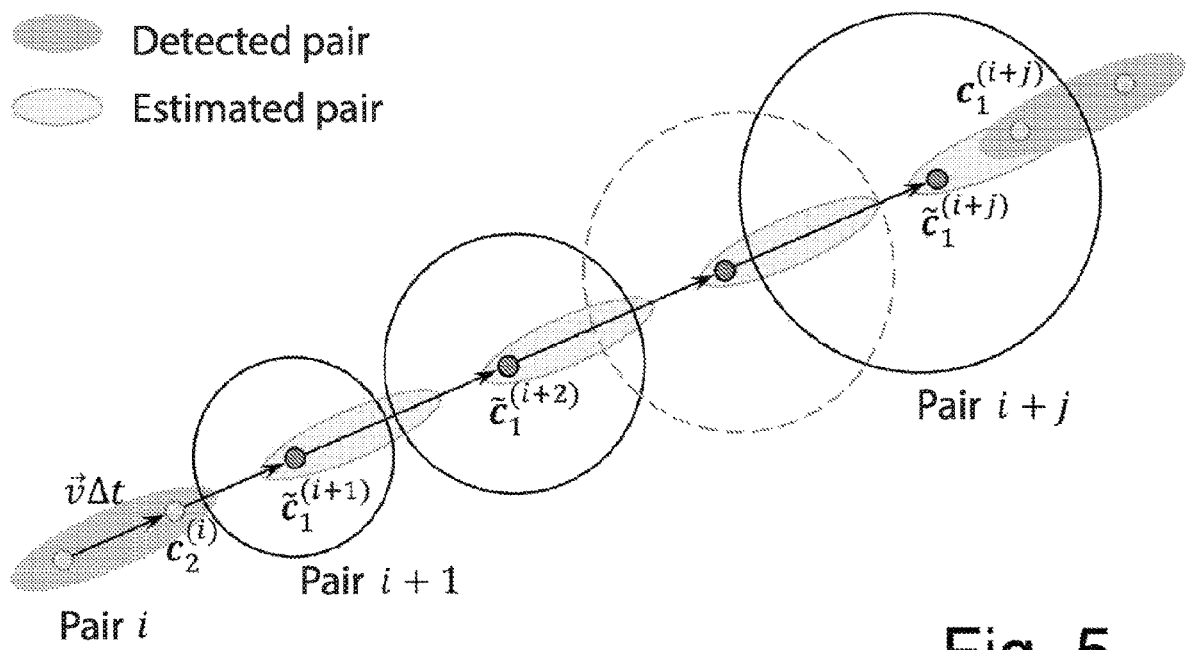
FIG. 5 schematically illustrates a procedure for searching, in a plurality of subsequent pairs of images, for centroids of clusters of pixels that are related to one and the same tracked object, according to a preferred embodiment of the present invention.

Conveniently, the radius of the circle is selected proportionally with respect to the estimated displacement of the centroid, i.e. with respect to $\Delta c^{i-1,i}$. When the search for the centroid fails, the search can be extended to pairs of subsequent images with the same criterion described so far. In this regard we can refer to FIG. 5 that schematically illustrates a procedure for searching, in a plurality of subsequent pairs of images, for centroids of clusters of pixels that are related to a tracked object. In particular, as illustrated in FIG. 5, the radius of the circle used for the search is conveniently increased as the centroid estimated displacement increases $\Delta c^{i-1,i+j}$, where j=1, 2, . . . .

2.2 Velocity-Based Filtering

Once carried out the position-based search, various identification issues may occur, that is:

more than a centroid fall within the circle, the centroid falls within the circle not belonging to the searched object.

In both cases, the velocity-based filtering can be a good support. Such filtering compares the velocity assessed in the last pair of images with the average velocity given by the equation (1). If the angle between the two velocities is below a predefined threshold (for example settable by a user), then the centroid is confirmed as belonging to the same object, otherwise it is removed.

2.3 Density-Based Filtering

If, following the velocity-based filtering, uncertainty still remains on more candidate centroids, a density-based filtering can be conveniently applied. In this case, a minimising process is applied, such that the following cost function must be minimised:

$$J = \Delta \rho_{rel} + \Delta c_{rel}.$$

In such cost function, the two terms are assessed as:

$$\Delta \rho_{rel} = \frac{\rho_i - \bar{\rho}}{\bar{\rho}},$$

where the average density $\bar{\rho}$ is assessed in the same way as the average velocity $\bar{v}_f^{(i-1)}$ computed on the base of the equation (1), while $\Delta c_{rel}$ is computed as:

$$\Delta c_{rel} = \frac{\|\Delta c^{i-1,i}\| - \|\Delta \tilde{c}^{i-1,i}\|}{\|\Delta \tilde{c}^{i-1,i}\|}.$$

In this last equation, the term $\Delta c^{i-1,i}$ is the displacement between the previous centroid and the present centroid detected, while $\Delta \tilde{c}^{i-1,i}$ is the expected displacement.

Among the centroids admitted to this last filtering step, the one that minimises the cost function J is accepted.

From the above description, the innovative characteristics and the technical advantages of the present invention are immediately clear to the expert in the field.

In particular, it must be underlined that the present invention allows to detect and track orbiting object by means of on-board processing data of optical observations carried out by a space platform.

In particular, the present invention allows to enable space surveillance and tracking operations (SST) directly on board a space platform, as long as it is provided with at least an optical sensor. Thereby, the present invention will represent an important support for updating catalogues of objects orbiting around the earth.

The results obtained through the on-board implementation of the method according to the present invention, that is information items of detected and tracked orbiting object, will be able to be processed again on board to obtain further information items, or transmitted to earth to fulfil various needs, such as, for example, monitoring the population of space debris, updating catalogues of orbiting platforms, etc.

An advantage of the present invention is the minimum impact on the system architecture of a satellite or, more generally, of a space platform. In fact, for satellites housing at least a star tracker, the algorithm concerned can be used with image data already used to perform attitude estimate. More generally, observing and detecting can be carried out regardless of the satellite mission, that is when the optical sensor used and/or the processor and available for acquiring and/or processing data, enabling the satellite to play a further role of observer for the purposes of surveillance and monitoring of the space.

In conclusion, it is important to note that, even though the above described invention refers in particular to a well precise embodiment, it must not be considered as limited to such embodiment, all the variants, modifications and simplifications covered by the appended claims falling within its scope (such as, for example, solutions based on the use of other types of optical sensors such as one or more colour and/or black-and-white cameras or video cameras, one or more infrared sensors, etc.).

The invention claimed is:

1. Method (1) for detecting and tracking space objects, comprising:
    acquiring pairs of images by means of an optical sensor installed on a space platform in orbit around the earth, wherein each pair of images comprises a respective first image and a respective second image acquired immediately after said respective first image; and,
    for each new pair of images acquired, carrying out a merging operation and a tracking operation;
    wherein the merging operation includes:
    identifying, in the first image of the new pair of images, first clusters of pixels related to potential space objects imaged in said first image;
    identifying, in the second image of the new pair of images, second clusters of pixels related to potential space objects imaged in said second image; and
    detecting pairs of clusters of pixels each comprising a respective first cluster of pixels and a respective second cluster of pixels both related to one and the same potential space object imaged in the new pair of images, wherein said respective first and second clusters of pixels are merged together;
    wherein the tracking operation includes detecting, from among the pairs of clusters of pixels merged together, pairs of clusters of pixels related to space objects detected in one or more previous pairs of images, on the basis of stored tracking information items indicative of last positions and average velocities of space objects detected in one or more previous pairs of images; and
    wherein the merging operation further includes computing:
    a respective centroid of each first cluster of pixels and of each second cluster of pixels; and
    a displacement velocity of the centroids of the pairs of clusters of pixels merged together;
    wherein the stored tracking information items are indicative of a last centroid position and of an average velocity related to a given space object detected in one or more previous pairs of images;
    wherein the tracking operation further includes:
    estimating a new centroid position for the given space object based on
        the last centroid position and the average velocity related to said given space object, and
        a given time interval elapsed between acquisition of the image for which said last centroid position was computed, and acquisition of the first image of the new pair of images;
    detecting, from among the pairs of clusters of pixels merged together, a pair of clusters of pixels related to the given space object for which the centroid of the respective first cluster of pixels is within a search area that is centered on the new centroid position estimated and that has predefined dimensions; and
    updating/integrating the stored tracking information items based on the displacement velocity and the positions of the centroids of the pair of clusters of pixels related to the given space object.

2. The method of claim 1, wherein, in the tracking operation, estimating a new centroid position for the given space object includes:
    estimating a centroid displacement based on the average velocity related to the given space object and on the given time interval; and
    estimating the new centroid position based on the last centroid position related to the given space object and on the estimated centroid displacement;
    and wherein the predefined dimensions of the search area increase as the estimated centroid displacement increases.

3. The method of claim 2, wherein, in the merging operation, computing the displacement velocity of the centroids of the pairs of clusters of pixels merged together includes computing magnitude and direction of the displacement velocity of said centroids;
    and wherein, in the tracking operation, detecting a pair of clusters of pixels related to the given space object includes:
    if several pairs of clusters of pixels merged together have the centroid of the respective first cluster of pixels within the search area, detecting the pair of clusters of pixels related to the given space object based on a comparison between the directions of the displacement velocities of the centroids of said pairs of clusters of pixels and the direction of the average velocity related to the given space object.

4. The method of claim 3, wherein the merging operation further includes computing a respective density of each pair of clusters of pixels merged together based on a respective overall number of pixels of the two clusters of pixels merged together and on an overall length of said two clusters of pixels merged together;
    wherein the stored tracking information items are also indicative of an average density related to the given space object;
    wherein, in the tracking operation, detecting a pair of clusters of pixels related to the given space object further includes:
    if several pairs of clusters of pixels are detected based on the comparison between the directions of the displacement velocities of the centroids and of the average velocity, detecting the pair of clusters of pixels related to the given space object based on the average density related to the given space object and on the densities of said pairs of pixel clusters;
    and wherein the stored tracking information items are updated/integrated also based on the density of the pair of clusters of pixels related to the given space object.

5. The method of claim 4, wherein, if several pairs of clusters of pixels are detected based on the comparison between the directions of the displacement velocities of the centroids and of the average velocity, the pair of clusters of pixels related to the given space object is detected minimising a cost function based on the average density related to the given space object and on the estimated centroid displacement.

6. The method according to claim 1, wherein the merging operation further includes discarding some pairs of clusters of pixels merged together according to a predefined selection criterion; and wherein the tracking operation is carried out only for the pairs of clusters of pixels merged together that have not been discarded.

7. The method according to claim 1, wherein the optical sensor is a star tracker.

8. Electronic processing unit designed to be installed on board a space platform equipped with an optical sensor; said electronic processing unit being configured to carry out the merging and tracking operations of the method of claim 1.

9. Space platform equipped with an optical sensor and with the electronic processing unit as claimed in claim 8.

10. The space platform of claim 9, wherein the optical sensor is a star tracker.

11. Computer program product comprising portions of software and/or firmware code which are:
- loadable on an electronic processing unit designed to be installed on board a space platform equipped with an optical sensor; and
- such that to cause, when loaded, said electronic processing unit to become configured to carry out the merging and tracking operations of the method of claim 1.

* * * * *